US011210880B2

(12) United States Patent
Troesch

(10) Patent No.: US 11,210,880 B2
(45) Date of Patent: Dec. 28, 2021

(54) ACCESS CONTROL SYSTEM HAVING RADIO AUTHENTICATION AND PASSWORD RECOGNITION

(71) Applicant: INVENTIO AG, Hergiswil (CH)

(72) Inventor: Florian Troesch, Erlenbach (CH)

(73) Assignee: Inventio AG

( * ) Notice: Subject to any disclaimer, the term of this patent is extended or adjusted under 35 U.S.C. 154(b) by 0 days.

(21) Appl. No.: 16/955,318

(22) PCT Filed: Dec. 13, 2018

(86) PCT No.: PCT/EP2018/084797
§ 371 (c)(1),
(2) Date: Jun. 18, 2020

(87) PCT Pub. No.: WO2019/121336
PCT Pub. Date: Jun. 27, 2019

(65) Prior Publication Data
US 2021/0056792 A1 Feb. 25, 2021

(30) Foreign Application Priority Data
Dec. 20, 2017 (EP) .................................... 17209079

(51) Int. Cl.
*G07C 9/23* (2020.01)
*G07C 9/28* (2020.01)
(Continued)

(52) U.S. Cl.
CPC ........... *G07C 9/23* (2020.01); *G07C 9/00309* (2013.01); *G07C 9/28* (2020.01); *G07C 9/29* (2020.01);
(Continued)

(58) Field of Classification Search
CPC ....................................................... G07C 9/23
See application file for complete search history.

(56) References Cited

U.S. PATENT DOCUMENTS 5,903,216 A * 5/1999 Sutsos ................ G07C 9/00182
340/542
6,237,036 B1 * 5/2001 Ueno .................... H04L 63/101
709/201
(Continued)

FOREIGN PATENT DOCUMENTS

CN 105051763 A 11/2015
CN 106537478 A 3/2017
(Continued)

*Primary Examiner* — K. Wong
(74) *Attorney, Agent, or Firm* — Bressler, Amery and Ross; Pierre R. Yanney

(57) ABSTRACT

An access control system receives an identifier of a mobile electronic device when it is located in a public area, from which a user can request access to an access-restricted area. A dataset is created, which is assigned to the user present in the public area, for the identifier and for storing a password in the first dataset such that the password is assigned to the identifier. A code processing unit acquires a password presented by the user when the user requests access to the access-restricted area. A processor unit determines if the identifier is assigned to a user profile in a database, authenticates the user as having access authorization in the event of such an assignment and determines if the acquired password matches the password stored in the dataset, wherein the user is recognized as an access-requesting user in the event of a match.

15 Claims, 2 Drawing Sheets

(51) Int. Cl.
  *G07C 9/29* (2020.01)
  *G07C 9/00* (2020.01)
(52) U.S. Cl.
  CPC .......... *G07C 2009/00769* (2013.01); *G07C 2009/00841* (2013.01)

(56) References Cited

U.S. PATENT DOCUMENTS

| | | | |
|---|---|---|---|
| 10,163,288 B2* | 12/2018 | Troesch | G07C 9/00309 |
| 11,011,001 B2* | 5/2021 | Kuster | G07C 9/00896 |
| 11,049,346 B2* | 6/2021 | Friedli | G06K 9/00926 |
| 2007/0025315 A1 | 2/2007 | Gerstenkorn | |
| 2010/0219234 A1 | 9/2010 | Forbes | |
| 2012/0068818 A1 | 3/2012 | Mizon | |
| 2015/0178698 A1 | 6/2015 | Schulz | |
| 2016/0248782 A1 | 8/2016 | Troesch | |

FOREIGN PATENT DOCUMENTS

| | | |
|---|---|---|
| CN | 107004312 A | 8/2017 |
| EP | 2237234 A1 | 10/2010 |
| WO | 2010112586 A1 | 10/2010 |
| WO | 2015049186 A1 | 9/2015 |
| WO | 2016087483 A1 | 6/2016 |

\* cited by examiner

ACCESS CONTROL SYSTEM HAVING RADIO AUTHENTICATION AND PASSWORD RECOGNITION

CROSS-REFERENCE TO RELATED APPLICATIONS

This application is the national phase application under 35 U.S.C. § 371 claiming the benefit of priority based on International Patent Application No. PCT/EP2018/084797, filed on Dec. 13, 2018, which claims the benefit of priority based on European Patent Application No. 17209079.7, filed on Dec. 20, 2017. The contents of each of these applications are herein incorporated by reference.

FIELD OF THE INVENTION

The technology described herein generally pertains to an access control system that grants an authorized user access to an access-restricted area in a building or a compound. Exemplary embodiments of the technology particularly pertain to an access control system with a transmitter and receiver unit and to a method for operating such an access control system.

BACKGROUND OF THE INVENTION

Access control systems can be designed in many different ways. For example, the designs may concern the way, in which users (persons) have to identify themselves as having access authorization, e.g. with a key, a magnetic card, chip card or RFID card or with a mobile electronic device (such as a mobile telephone). WO 2010/112586 A1 describes an access control system, in which a mobile telephone carried along by a user transmits an identification code to an access node. If the identification code is determined to be valid, the access node transmits an access code to the mobile telephone, which displays the access code on a screen. When the user holds the mobile telephone at a camera such that it can detect the displayed access code, the access control system checks if the detected access code is valid. Access is granted to the user if the access code is valid.

A high volume of moving people can occur in a building with many floors at certain times of the day, e.g. in the lobby of an office building when a large number of employees enter the building in the morning or after a lunch break in order to reach their workstations. At these times, not only the efficiency of an elevator system installed in the building is subjected to high demands, but also the access control system, e.g. in order to prevent the formation of a waiting line in front of the access point as far as possible. Consequently, there is a need for an access control system that meets these demands, wherein the access control system nevertheless can reliably distinguish between persons having access authorizations and unauthorized persons.

SUMMARY OF THE INVENTION

One aspect of such a technology concerns a method for operating a system for controlling access to an access-restricted area in a building or a compound. The system comprises a transmitter and receiver unit for the radio communication with mobile electronic devices carried along by users, a storage unit, a processor unit and a code acquisition unit. A first identifier of a first mobile electronic device of a first user is received by the transmitter and receiver unit when the first mobile electronic device is located in a public area, from which the first user can request access to the access-restricted area. The received first identifier is stored in the storage unit, wherein a first dataset is created for the first identifier and assigned to the first user present in the public area. A plurality of datasets can be stored in the storage unit, wherein each of these datasets is assigned to a user present in the public area. A first password is stored in the first dataset such that the first password is assigned to the first identifier. The processor unit determines if the first identifier is assigned to a user profile in a database in order to authenticate the first user as having access authorization in the event of such an assignment. A password presented by the first user is acquired by the code acquisition unit when the first user requests access to the access-restricted area. The processor unit determines if the acquired password matches the first password stored in the first dataset of the storage unit, wherein the first user is recognized as an access-requesting user in the event of a match.

Another aspect of the technology concerns a system for controlling access to an access-restricted area in a building or a compound. The system comprises a transmitter and receiver unit for the radio communication with a first mobile electronic device carried along by a first user, wherein said transmitter and receiver unit is designed for receiving a first identifier of the first mobile electronic device when the first mobile electronic devices located in a public area, from which the first user can request access to the access-restricted area. A storage unit of the system is designed for creating a first dataset, which is assigned to the first user present in the public area, for the first identifier and for storing a first password in the first dataset such that the first password is assigned to the first identifier. A plurality of datasets can be stored in the storage unit. The system furthermore comprises a code acquisition unit that is designed for acquiring a password presented by the first user when the first user requests access to the access-restricted area. A processor unit of the system is designed for determining if the first identifier is assigned to a user profile in a database and for authenticating the first user as having access authorization in the event of such an assignment; it is furthermore designed for determining if the acquired password matches the first password stored in the first dataset of the storage unit, wherein the first user is recognized as an access-requesting user in the event of a match.

The technology described herein creates an access control system, in which a first phase of a verification as to whether the user has access authorization already takes place when the user is still located relatively far from the access point. For example, the user can move in the direction of the access point to the access-restricted area while the mobile electronic device of the user already is or was in communication with the transmitter and receiver unit of the access control system in an exemplary embodiment. The transmitter and receiver unit receives the identifier of the mobile electronic device of the user. A user profile for the user is stored if the user is registered as having access authorization in the access control system. User-specific data (e.g. name and authorizations), which makes it possible to authenticate the user, is stored in this user profile. A password presented by the user is acquired in a second phase if the user would like to gain access to the access-restricted area. For example, the password may be an encoded password that is displayed on a screen of the mobile device. The user is recognized if the acquired password matches the stored password and a building action can be initiated for the user.

Depending on the design, the password may be stored in a storage unit of the mobile device, e.g. together with the identifier of the mobile device. In this case, the mobile device transmits the identifier and the password to the transmitter and receiver unit (essentially simultaneously or successively). The identifier and the password are then stored in the created dataset. In another embodiment, the access control system generates the password, transmits the password to the mobile device and stores it in the dataset created for the received identifier. In this case, the dataset also contains the identifier, as well as the password.

A large number of users (e.g. several dozen or several hundred users) may be authorized to access an access-restricted area in a building or an area. In such a situation, the transmitter and receiver unit receives a plurality of identifiers, which are stored in the storage unit in the form of datasets. Nevertheless, the technology described herein provides the advantage that the verification of a match takes place quickly because the password acquired on site is only matched with the passwords of actually present users. A present user can therefore gain access to the access-restricted area without significant hold-up or delay. This reduces the risk of a waiting line forming in front of the access point, particularly at a high volume of moving people.

The technology not only provides a faster verification, but can also be used for high-security applications, for example because an authentication takes place via a secured (encrypted) radio link. The wirelessly transmitted identifier must belong to a registered user in the system; in this way, the user can be recognized and the rights (e.g. access rights) defined for the user can be determined. A separate channel (e.g. acquisition of an optical code) is utilized in addition to the radio link, wherein said separate channel may be realized in accordance with multiple applicable technologies. This channel makes it possible to identify which of the potentially numerous present users actually requests access such that access is only granted to this user and the building action defined for this user is carried out.

In the technology described herein, the verification of a match is on the one hand restricted to a limited number of passwords. On the other hand, the authentication and security check of a user take place based on the received identifier, which is assigned to a stored user profile in the event of a user having access authorization. With respect to the acquisition and processing of passwords, this means that the passwords are subject to relatively low demands, for example with respect to their encoding (e.g. (alpha)numeric, PIN, QR code, barcode). Consequently, there is greater flexibility with respect to the choice of the type of password; however, the security requirements can nevertheless be ensured.

In an exemplary embodiment, the verification of a match comprises the generation of a result signal. A building action is initiated in the event of a match. The building action is specific to the recognized user. This building action is determined by reading a user profile of the recognized user, which is stored in the storage unit; for example, this user profile may indicate the floor, which the user is authorized to access. The user-specific building action may comprise unlocking of a building door (e.g. an office or apartment door including one or more doors located on the way from the access point to the office or apartment door). In connection with an elevator system, the user-specific building action may also comprise the registration of a destination call to a destination floor defined for the user. The ease of use is thereby improved because the user can directly walk to an assigned elevator car without having to input an elevator call himself. The user-specific building action may also comprise a combination of unlocking a building door and registering a destination call.

The result signal also indicates that the user has access to the access-restricted area whereas the result signal indicates that the user does not have access to the access-restricted area in the event of a mismatch. In an exemplary embodiment, a control signal can be generated as a function of the result signal in order to release a (physical) barrier (such as a gate, door or turnstile). An unreleased barrier remains blocked. In another exemplary embodiment, the control signal activates an information unit in the event of a denial of access. The information unit can be used, for example, in connection with an access point without physical barrier. If an unauthorized user is detected at the access point, the information unit may in one variation generate an alarm that can be (acoustically and/or visually) perceived at the access point. In another variation, the control signal may alert a security service that subsequently screens the user identified as having no access authorization.

In an exemplary embodiment, the radio link between the transmitter and receiver unit and a mobile electronic device of a user is realized in accordance with a Bluetooth standard or a WLAN/WiFi standard. This is advantageous because standard mobile telephones or smartphones are already equipped with technology according to one of these standards such that no special devices are required.

The technology described herein also allows flexibility with respect to the identifier of a mobile device. The identifier of a mobile device may comprise, for example, a permanently assigned device identification number of the mobile device or a telephone number assigned to the mobile device. In an exemplary embodiment, each mobile device is equipped with application-specific software that generates a unique and time-invariant identifier for the mobile device. The identifier allows a positive identification of a mobile device (regardless of whether it comprises a device identification number or telephone number or is generated by software).

BRIEF DESCRIPTION OF THE DRAWINGS

Different aspects of the enhanced technology are described in greater detail below with reference to exemplary embodiments illustrated in the figures. Identical elements are identified by the same reference symbols in the figures. In these figures.

DETAILED DESCRIPTION OF EMBODIMENTS OF THE INVENTION

Figure 1:
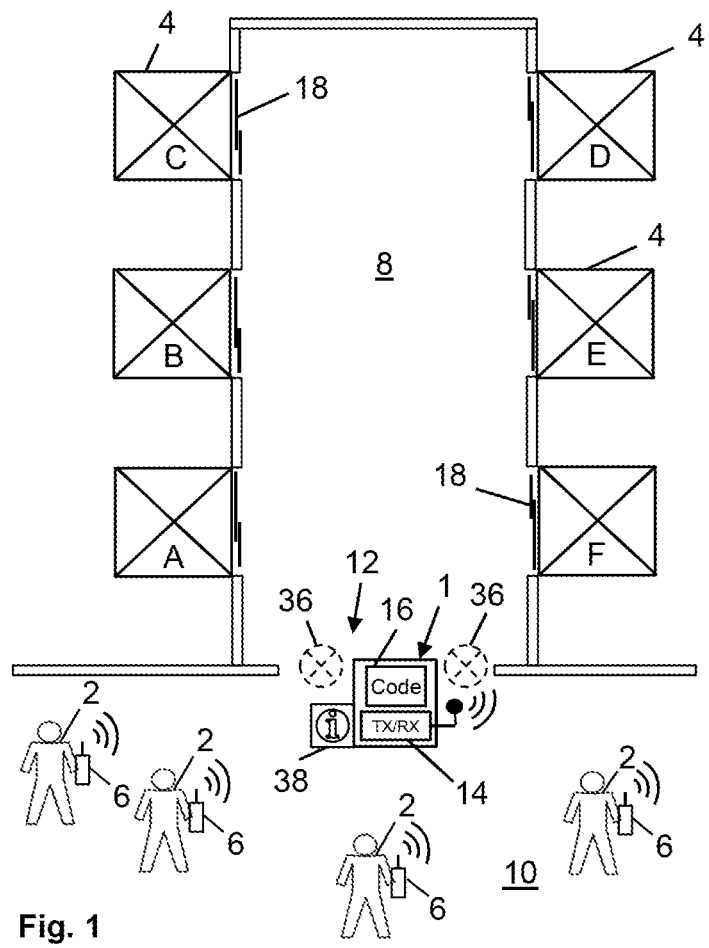
FIG. 1 shows a schematic representation of an application example of an access control system in connection with a building.

FIG. 1 shows a schematic representation of an application example of an access control system 1 in connection with a situation in a building, of which only a few walls, rooms 4 and areas 8, 10 are illustrated in order to provide a better overview. For example, the rooms 4 may be offices, apartments, halls and/or elevator cars of an elevator system. In the application of the access control system 1 illustrated in FIG. 1, multiple users 2, who carry along mobile electronic devices 6 (also simply referred to as mobile devices 6 below), are located in the area 10. In this example, the area 10 is not subject to any access restriction and therefore also referred to as public area 10 in the following description. The public area 10 may be an area in the building or outside the building. An access point 12 separates the public area 10 from the area 8, which is subject to an access restriction and borders on the rooms 4. A person skilled in the art understands that the access control system 1 is not limited to applications within a building, but rather can also be used analogously for controlling access to an access-restricted area in a compound. In this description, the term "building" refers, e.g., to residential buildings, commercial buildings, sports arenas and shopping centers, but also to ships.

The access control system 1 monitors the access point 12 such that only authorized users 2 can enter the area 8, e.g. by blocking or releasing a door, a gate, a turnstile or another physical barrier or lock, by controlling (e.g. activating) an information unit 38 upon the detection of an unauthorized user 2 in the event of an access point without physical barrier or by combining these measures. For example, the information unit 38 may trigger an optical and/or acoustical alarm or initiate the notification of a security service. In FIG. 1, the access control system 1 is arranged at the access point 12. The access point 12 consists of multiple individual locks depending on the volume of moving people, for which the access control system 1 is designed; in FIG. 1, for example, each of the two turnstiles 36 may represent a lock. A person skilled in the art understands that the access control system 1 or its components may be arranged in different ways in a concrete implementation.

For example, the rooms 4 illustrated in FIG. 1 may belong to a group of elevators that comprises, for example, six elevators (A-F). In an exemplary embodiment, the recognition of a user 2 at the access point 12 means that the user 2 would like to be transported to a destination floor defined for this user 2 by means of one of the elevators. A destination call, to which an elevator is assigned by an elevator control, is initiated upon recognition of the user 2. The user 2 is notified of the assigned elevator, for example, by means of a display unit. A display unit may be respectively assigned to each turnstile 36 in the situation illustrated in FIG. 1. When the user 2 utilizes one of the turnstiles 36 illustrated in FIG. 1, for example, the access control system 1 detects the turnstile 36, at which the user 2 is located, and activates the display unit arranged at this turnstile in order to display the assigned elevator (e.g. "A").

Figure 2:
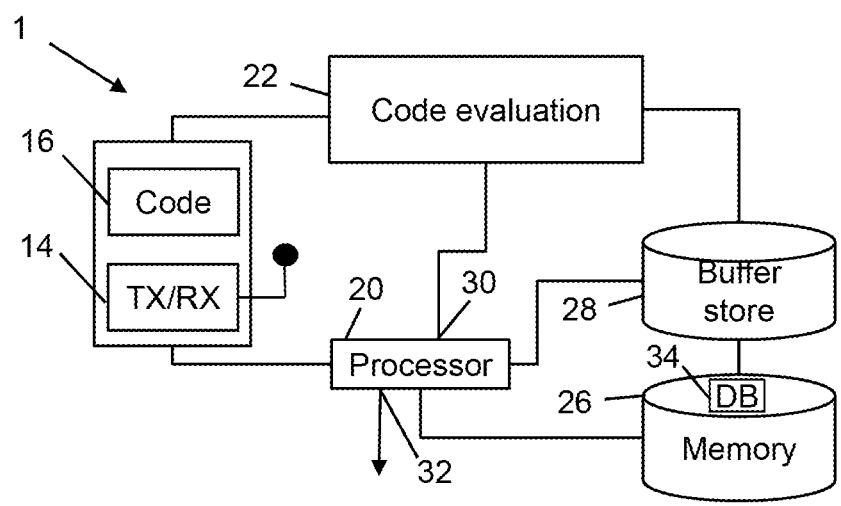
FIG. 2 shows a schematic representation of an exemplary embodiment of an access control system.

As indicated in FIG. 1, the access control system 1 according to an exemplary embodiment comprises a transmitter and receiver unit 14 (identified by TX/RX in FIG. 1) and a code processing unit (16); additional components of the access control system 1 are illustrated in FIG. 2. In an exemplary embodiment described herein, the transmitter and receiver unit is designed for receiving radio signals, wherein said transmitter and receiver unit is also referred to as transceiver 14 in the following description. The transceiver 14 communicates with the mobile electronic devices 6 when they are located in the radio range of the transceiver 14, i.e. when a radio signal transmitted by a mobile device 6 has at the location of the transceiver 14 a signal strength (expressed, e.g., in the form of an RSSI value (Received Signal Strength Indicator)), which is greater than a threshold value defined for a secure reception. The communication takes place, for example, via a near-field radio network such as a Bluetooth radio network, a WLAN/WiFi radio network or a ZigBee radio network. Bluetooth is a standard according to IEEE 802.15.1, WLAN/WiFi is a standard according to IEEE 802.11 and ZigBee is a standard according to IEEE 802.15.4; radio networks according to these standards serve for wirelessly linking devices over a short distance of about a few meters to about one hundred meters. In this case, the radio network forms the interface, via which the mobile electronic devices 6 and the transceiver 14 can communicate with one another.

In the situation illustrated in FIG. 1, the technology described herein can be advantageously used for operating the access control system 1 with the least complexity possible and for conveniently granting the user 2 access to the access-restricted area 8. The operation of the access control system 1 according to an exemplary embodiment is briefly summarized below: as soon as a user 2 is located in the radio range of the transceiver 14, the mobile device 6 of the user automatically communicates with the transceiver 14 via a radio link and the mobile device 6 transmits its device-specific identifier to the transceiver 14. In the situation according to FIG. 1, the transceiver 14 receives a plurality of identifiers. The access control system 1 stores these identifiers in datasets created for this purpose and therefore "knows" how many mobile devices 6 are located in the radio range at a certain time and, if their users 2 are users 2 registered for the building, to which users 2 the mobile devices 6 belong. At this point, the access control system 1 can check the rights defined for each registered user 2 in the building (e.g. access authorization to one or more rooms 4 and/or floors including potential time limits).

The thusly detected users 2 represent a group of present users. If one of the present users 2 would like to gain access to the access-restricted area 8, the user 2 moves in the direction of the access point 12. The user 2 presents a password to the code processing unit (16, 22) upon his arrival at said access point. The access control system 1 determines the password in the course of a code acquisition and code evaluation process and compares this password with stored passwords assigned to the present users 2. This comparison is restricted to the group of present users 2; consequently, only the datasets of this group are searched to the effect whether the determined password matches one of the stored datasets. This makes it possible to determine which of the present users 2 actually would like to gain access at this point and—depending on the design—at which lock (e.g. turnstile 36) the user 2 is located. For example, a building action defined in a user profile can be initiated for this user 2; for example, a destination call may be registered for the user 2, wherein an elevator is subsequently assigned to said destination call and transports the user 2 to the floor, on which the workstation of the user 2 is located.

FIG. 2 shows a schematic representation of an exemplary embodiment of the access control system 1. In this exemplary embodiment, the access control system 1 has a modular structure and comprises the code processing unit, which includes a code acquisition unit 16 (code in FIG. 2) and a code evaluation module 22 (code evaluation in FIG. 2). The access control system 1 furthermore comprises the transceiver 14, a processor 20, a storage unit 26 (storage in FIG. 2) and an intermediate storage unit 28 (intermediate storage in FIG. 2). A person skilled in the art understands that at least one of the storage units 26, 28 may also be assigned to the code processing unit (16, 22) or that the function of the intermediate storage unit 28 can also be fulfilled by the storage unit 26 such that the intermediate storage 28 can be eliminated in an exemplary embodiment.

The processor 20 has an output 32 for a control signal and an input 30 for a result signal generated by the code evaluation module 22. The processor 20 controls the access control system 1 in dependence on the result signal in such a way that the user 2 is granted or denied access. If access is granted, for example, a destination call can also be initiated and the elevator assigned to this destination call can be displayed to the user 2. If the areas 8, 10 are separated, for example, by a physical barrier (such as the turnstile 36 in FIG. 1), the control signal releases the barrier (e.g. in connection with the display of the assigned elevator) or blocks this barrier. However, if the areas are separated without a physical barrier, the control signal activates, for example, the information unit 38 in order to trigger an alarm or alerts a security service in the event of an unauthorized user 2. If a barrier is provided, the information unit 38 may also be activated in order to display to the user 2 or a security service that the barrier has been released or blocked.

The code acquisition unit 16 may comprise a reader that can acquire data based on one of different known technologies. For example, the reader may acquire data from magnetic cards, chip cards, RFID cards or mobile electronic devices (e.g. mobile telephone, smartphone, tablet) or data from optical codes (barcodes, QR codes, color codes), which are printed on different carrier materials or displayed on screens of mobile electronic devices (e.g. mobile telephone, smartphone, tablet). In another exemplary embodiment, the reader may comprise a device for acquiring and/or detecting biometric parameters (e.g. patterns of fingertips, hand surfaces or eyes (iris) or voice characteristics.

If the reader operates, for example, in accordance with radio frequency identification (RFID) technology, the reader is an RFID reader that receives data from an RFID card placed in radio range. The data is stored in a data storage of the RFID card and comprises, e.g., an identification code. For example, the radio frequency used by the RFID reader and the RFID card amounts to 125 kHz, 13.56 MHz or 2.45 GHz. If an optical technology is used, however, the reader is an optical reader (e.g. a camera or scanner) that acquires the pattern of an optical code, which is printed on a carrier material or displayed on an electronic device. An exemplary technology for generating and acquiring an optical color code, which is displayed on an electronic device, is described in WO 2015/049186.

The transceiver 14 and the code acquisition unit 16 (including other components of the code processing unit) may be accommodated in a housing that is arranged, for example, at the access point 12 as illustrated in FIG. 1. The transceiver 14 and the code acquisition unit 16 (including other components of the code processing unit) may alternatively also be arranged separately of one another in the form of separate units, e.g. spatially separated from one another in an area around the access point 12, wherein the code acquisition unit 16 has to be arranged in such a way that it is accessible to the users 2, namely such that the users 2 can present their passwords in sequence. A code acquisition unit 16 is provided on each barrier (e.g. turnstile 36) in an embodiment of the access control system 1.

The code evaluation module 22 is illustrated in the form of a separate unit that is connected to the processor 20 and the intermediate storage unit 28. In an exemplary embodiment, the code evaluation module 24 and the code acquisition unit 16 form a unit. The storage units 26, 28 are likewise illustrated in the form of separate units; depending on the design, they may be combined in a storage unit, in which they occupy separate storage areas. The storage units may respectively comprise, for example, a hard disk drive (HDD) or CD/DVD drive, a solid-state-drive/solid-state-disk (SSD), combinations thereof or other storage units for digital data.

According to the technology described herein, the mobile device 6 transmits its device-specific identifier to the transceiver 14 as soon as it is located in the radio range of the transceiver 14. The processor 20 controls the storage of the received identifier in the form of a dataset in the intermediate storage unit 28. Multiple users 2 are located in the public area 10 in the situation illustrated in FIG. 1. As an example, it is assumed that the mobile devices 6 of the present users 2 are designed for utilizing the technology described herein, which among other things includes the transmission of an identifier. A few of the present users 2 may request access to the access-restricted area 8, some users may be on their way from the area 8 to a building exit and other users may be on their way to another part of the building. In the situation shown, this means that not every user 2 located in the public area 10 actually wants to enter the area 8. From the perspective of the access control system 1, however, all present users 2 are potential users 2 who sooner or later could request access.

In such a situation, the intermediate storage unit 28 stores a dataset for each present user 2, wherein said dataset contains the identifier of the mobile device 6 assigned to the user 2 and the password. This may concern mobile devices 6, the users 2 of which are registered as users 2 having access authorization in the access control system 1, as well as mobile devices 6, the users 2 of which are not registered. When a user 2 leaves the public area 10 such that the associated mobile device 6 is located outside the radio range, the dataset stored for this user 2 in the intermediate storage unit 28 is deleted and the intermediate storage unit 28 is updated.

The access control system 1 determines the present users 2 with the aid of the communication between the mobile devices 6 and the transceiver 14. A radio module such as a module according to a Bluetooth standard is activated in each mobile device 6 in order to communicate with the transceiver 14 as soon as it is located in the radio range of the transceiver 14. The mobile device 6 is correspondingly configured for transmitting the device-specific identifier and, depending on the design, also the password. For example, it may comprise an application-specific software application (also referred to as app) that can be activated, e.g. by the user 2. In an exemplary embodiment, the application-specific software application is used in connection with the access control and the utilization of elevators. The application-specific software generates a unique and time-invariant identifier for the mobile device 6 in an exemplary embodiment.

Such a software-generated identifier represents an alternative to the aforementioned device identification number and a telephone number. The password can be generated accordingly. In an exemplary embodiment, the mobile device 6 receives the password from the access control system 1 and stores the password in a storage unit of the mobile device 6.

A user profile is created in the access control system 1 for each registered user 2, i.e. the user profile is stored in a database 34 in the form of a dataset. In an exemplary embodiment, the database 34 is established in the storage unit 26. The user profile comprises personal data of the user 2 (e.g. name, reason for authorization (resident, employee, external service provider, visitor)), access authorizations (e.g. certain rooms 4 and floors) and potential time limits (e.g. access from Monday to Friday between 7 a.m. and 8 p.m.). The user profile may also be stored in a database of a building management system as an alternative to the storage of the user profile in the access control system 1, wherein the access control system 1 can access this database via a communication network.

If one of the present users 2 would like to gain access to the access-restricted area 8, the user 2 presents the password, which is acquired by the code acquisition unit 16 and fed to the code evaluation module 22. The code evaluation module 24 starts a search algorithm in order to determine if the acquired password can be assigned to a present user 2 in the intermediate storage unit 28. The user 2 of the group of users 2, who would like to gain access at this point, is recognized if the acquired password matches a stored password.

For example, the mobile device 6 may be a mobile telephone, a smartphone, a tablet PC or a smartwatch, wherein these devices are usually equipped with hardware that allows communication via a near-field radio network. However, the mobile device 6 may also be realized in the form of a pair of spectacles with a miniature computer or another computer-assisted device worn on the body (also referred to as "wearable device") if these devices are intended for near-field communication and for the storage of data. Depending on the design of the mobile device 6, it may comprise, e.g., a graphical user interface (also referred to as GUI) in order to selectively activate and deactivate the mobile device 6 and its functions.

Figure 3:
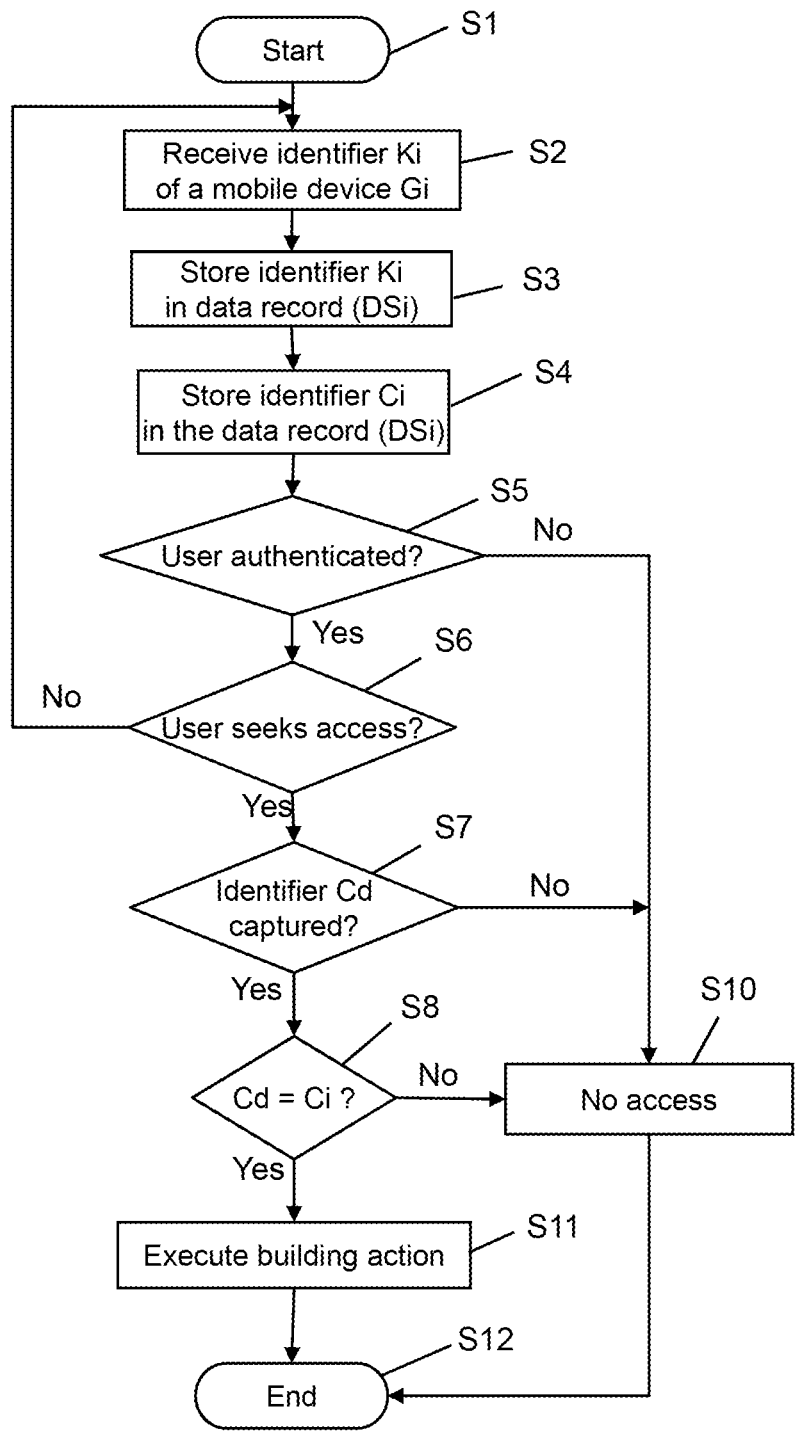
FIG. 3 shows a flow chart of an exemplary embodiment of an access control method as an aspect of a method for operating the access control system.

An exemplary access control method is described below with reference to FIG. 3 as an aspect of a method for operating the access control system 1 with the understanding of the above-described basic system components and their functionalities. The description refers to a user 2 who would like to enter the access-restricted area 8 at the access point 12, e.g. in order to use an elevator. The user 2 carries along a mobile device 6 and has activated its radio module (e.g. for Bluetooth communication). An associated software application is likewise activated. The method begins in step S1 and ends in step S12.

When the user 2 with his mobile device 6 is located in the public area 10 and in the radio range of the transceiver 14, the transceiver 14 receives a device-specific identifier transmitted by the mobile device 6 in step S2. The transceiver 14 and the mobile device 6 communicate in accordance with the same communication standard, namely via a radio link according to a Bluetooth standard in this exemplary embodiment.

The received identifier Ki is stored in step S3. The identifier Ki is stored in a dataset DSi created for this identifier in the intermediate storage unit 28.

In addition, a password Ci is stored in the dataset DSi created for the identifier Ki in step S4. The mobile device 6 transmits the password Ci in an exemplary embodiment. In this case, the transceiver 14 also receives the password Ci of the user 2. The mobile device 6 may transmit the identifier Ki and the password Ci essentially simultaneously or successively. Their storage may accordingly take place essentially simultaneously or successively.

In an exemplary embodiment, the access control system 1 generates the password Ci and stores it in the dataset DSi created for the received identifier Ki as soon as the user 2 with his mobile device 6 is located in the public area 10 and in the radio range of the transceiver 14. The access control system 1 transmits the password Ci to the mobile device 6 of the user 2. In this case, the dataset DSi also stores the identifier Ki, as well as the password Ci, for this user 2.

Steps S2-S4 are carried out for each mobile device 6 that is located in the radio range of the transceiver 14 and operates in accordance with the same communication standard as the transceiver 14. A plurality of identifiers and associated passwords corresponding to a group of present users 2 may be stored in the intermediate storage unit 28 at a certain time depending on the number of users 2 in the public area 10. A person skilled in the art understands that the intermediate storage unit 28 is updated once a mobile device 6 is no longer in the radio range, e.g. because the associated user 2 has left the public area 10 without requesting access to the access-restricted area 8 or because the associated user 2 has already entered the access-restricted area 8. The intermediate storage unit 28 therefore stores the datasets for users 2 who are present in the public area 10 at a certain time.

In step S5, it is determined if the user 2 can be authenticated. This is realized by means of the received identifier Ki. The user 2 is authenticated as having access authorization if the received identifier Ki can be assigned to a user profile stored in the access control system 1. If the user 2 can be authenticated, the method proceeds along the yes-branch to step S6. However, if the user 2 cannot be authenticated, the method proceeds along the no-branch to step S10, in which the user is treated as having no access authorization. Such an authentication is carried out for each present user 2.

In step S6, it is determined if one of the present users 2 requests access to the access-restricted area 8. The access control system 1 detects this request with the aid of the code acquisition unit 16 when the user 2 presents his assigned password Cd. In an exemplary embodiment, the user 2 holds the mobile device 6 in the vicinity of the code acquisition unit 16 such that it can acquire the password Cd, which is displayed on the screen of the mobile device 6 in the form of an optical code. If an access request is detected, the method proceeds along the yes-branch to step S7. Otherwise, the method reverts back to step S2 along the no-branch.

In step S7, it is determined if the password Cd acquired in step S6 can be assigned to a password Ci stored in the intermediate storage unit 28. The user 2 of the group of present users 2, who would like to gain access at this point, is recognized in the event of such an assignment. In this case, the method proceeds along the yes-branch to step S11, in which a user-specific building action is carried out for this user 2. For example, the building action may comprise registering a destination call for the user 2 (in accordance with the data of the existing user profile for this user 2), assigning an elevator to this destination call and displaying the assigned elevator to the user 2 at the access point 12. The building action may also comprise unlocking one or more doors, to which this user 2 has access authorization. A person skilled in the art understands that these building actions may also be carried out in combination.

However, if no password Ci stored in the intermediate storage unit 28 is assigned to the acquired password Cd, the method proceeds along the no-branch to step S10 and the user 2 is denied access. Depending on the design, a notification may inform the user 2, for example, that the user 2 should consult a person responsible for the building (e.g. reception personnel, security personnel). The security personnel may irrespectively also be notified directly in step S10.

In an exemplary embodiment, the access control system 1 is connected to an elevator system, particularly to an elevator control. The communication between the access control system 1 and the elevator control may take place via a communication network provided in the building. If the access control takes place, for example, in the lobby of the building, which the users 2 have to pass in order to reach the elevators, a destination call can be registered each time access is granted to the respective user 2. The elevator control of the elevator system processes the destination call and assigns an elevator thereto. The elevator assigned to the destination call can be displayed to the user 2, for example, on a terminal at the access point 12 or the user can be correspondingly notified by means of speech output. Consequently, the user 2 can directly walk to the assigned elevator without having to input an elevator call.

Depending on the design of the building and the handling of the access authorizations, the access control system 1 may also grant access to visitors and initiate building actions defined for the visitors. In connection with an elevator system, an exemplary building action may comprise registering a destination call for the visitor. An assigned elevator transports the visitor to the floor, on which the host is located. For example, the floor of the host may be stored in a visitor profile, which is temporarily created for the visitor, in connection with other invitation data (e.g. date, time, host). The visitor therefore does not have to bother with inputting the destination floor, particularly when visiting the building for the first time. The visitor may furthermore be provided with additional information for the better orientation in the building, for example by informing the visitor of the direction, in which he should walk (and potentially also how far) after exiting on the floor. The communication of such routing information may be realized, for example, by means of the mobile device 6 of the visitor and/or displays on the floors or in the elevator cars. In an exemplary embodiment, the access control system 1 generates and transmits a message to the host in order to inform the host that the visitor has been granted access. The host therefore can prepare for the arrival of the visitor in a timely manner.

The invention claimed is:

1. A method for operating a system for controlling access to an access-restricted area in a building or a compound, wherein the system comprises a transmitter and receiver unit for the radio communication with one or more mobile electronic devices carried along by users, a storage unit, a processing unit and a code processing unit, the method comprising:
   receiving a first identifier of a mobile electronic device of the one or more mobile electronic devices of a first user of the one or more users by means of the transmitter and receiver unit when the mobile electronic device is located in a public area, from which the first user can request access to the access-restricted area;
   storing the received first identifier in the storage unit, wherein a first dataset (DSi) is created for the first identifier and assigned to the first user present in the public area, wherein a plurality of datasets can be stored in the storage unit, and wherein each dataset of the plurality of datasets is assigned to a user of the one or more users present in the public area;
   storing a first password in the first dataset such that the first code word is assigned to the first identifier;
   determining if the first identifier is assigned to a user profile in a database by means of the processor unit in order to authenticate the first user as having access authorization in the event of such an assignment;
   acquiring a password presented by the first user by means of the code processing unit when the first user requests access to the access-restricted area; and
   determining if the acquired password matches the first password stored in the first dataset of the storage unit by means of the processor unit, wherein the first user is recognized as an access-requesting user in the event of a match.

2. The method according to claim 1, further comprising: generating a result signal, which initiates a building action if the acquired password matches the first password.

3. The method according to claim 2, further comprising: reading a user profile of the first user, which is stored in a database, in order to determine a user-specific building action.

4. The method according to claim 3, wherein the user-specific building action comprises unlocking a building door, to which the first user has access authorization, or registering a destination call to a destination floor defined for the first user or a combination of unlocking a building door and registering a destination call.

5. The method according to claim 2, further comprising: generating a control signal as a function of the result signal in order to release a barrier such that the first user can enter the access-restricted area.

6. The method according to claim 1, wherein the code processing unit configured to acquire the password from a screen of the mobile electronic device, on which the password is displayed in machine-readable form.

7. The method according to claim 6, wherein the displayed password is a numeric code, an alphanumeric code, a barcode, a QR code or a color code.

8. The method according to claim 1, wherein the code processing unit is configured to acquire the password from a data carrier, on which the password is displayed or stored.

9. The method according to claim 1, wherein the radio link between the transmitter and receiver unit and the mobile electronic device is based on a Bluetooth standard or a WLAN/WiFi standard, and wherein the transmitter and receiver unit receives the first identifier via the radio link when the mobile electronic device is located in the radio range of the transmitter and receiver unit.

10. The method according to claim 1, wherein the first identifier is generated by application-specific software, which is active on the mobile device, and wherein the first identifier is time-invariant.

11. The method according to claim 1, wherein the first identifier comprises a device identification number or a telephone number assigned to the mobile electronic device.

12. The method according to claim 1, wherein the first identifier and the first password are received by the transmitter and receiver unit when the mobile electronic device is located in the public area and transmits the first identifier and the first code word.

13. The method according to claim 1, wherein a dataset is stored in the storage unit for each mobile electronic device of the one or more mobile electronic devices, which transmits a device-specific identifier and an electronic code, when the one or more mobile electronic devices are located in the public area.

14. A system for controlling access to an access-restricted area in a building or a compound, comprising:
   a transmitter and receiver unit for radio communication with a mobile electronic device carried along by a user, wherein said transmitter and receiver unit is configured to receive a first identifier of the mobile electronic device when the mobile electronic device is located in a public area, from which the user can request access to the access-restricted area;
   a storage unit configured to create a first dataset (DSi), which is assigned to the user present in the public area, for the first identifier and for storing a first password in the first dataset such that the first password is assigned to the first identifier, wherein a plurality of datasets can be stored in the storage unit;

a code processing unit configured to acquire a password presented by the user when the user requests access to the access-restricted area; and a processor unit configured to:
- determine if the identifier is assigned to a user profile in a database,
- authenticate the user as having access authorization in the event of such an assignment, and
- determine if the acquired password matches the first password stored in the first dataset of the storage unit, wherein the user is recognized as an access-requesting user in the event of a match.

15. The system according to claim 14, wherein the processor unit is further configured to generate a result signal, which initiates a building action in the event of a match.

\* \* \* \* \*